US010234298B2

(12) United States Patent
Baughman et al.

(10) Patent No.: US 10,234,298 B2
(45) Date of Patent: *Mar. 19, 2019

(54) EMERGENCY RESPONSE RE-ROUTER

(71) Applicant: International Business Machines Corporation, Armonk, NY (US)

(72) Inventors: Aaron K. Baughman, Silver Spring, MD (US); Kulvir S. Bhogal, Fort Worth, TX (US); Gregory J. Boss, Saginaw, MI (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,422

(22) Filed: Dec. 14, 2017

(65) Prior Publication Data
US 2018/0106626 A1 Apr. 19, 2018

Related U.S. Application Data

(63) Continuation of application No. 14/519,298, filed on Oct. 21, 2014, now Pat. No. 9,903,726.

(51) Int. Cl.
*G01C 21/34* (2006.01)
*G01C 21/36* (2006.01)
*G06Q 10/06* (2012.01)
*H04W 4/90* (2018.01)

(52) U.S. Cl.
CPC ......... *G01C 21/3415* (2013.01); *G01C 21/36* (2013.01); *G06Q 10/063112* (2013.01); *H04W 4/90* (2018.02)

(58) Field of Classification Search
None
See application file for complete search history.

(56) References Cited

U.S. PATENT DOCUMENTS

| 5,960,337 | A | 9/1999 | Brewster et al. |
| 7,027,915 | B2 | 4/2006 | Craine |
| 8,314,683 | B2 | 11/2012 | Pfeffer |
| 8,526,910 | B2 | 9/2013 | Messerly |
| 8,527,198 | B2 | 9/2013 | Hardy |
| 9,143,915 | B2 | 9/2015 | Messerly |
| 9,300,799 | B2 | 3/2016 | Brown et al. |
| 9,628,331 | B2 | 4/2017 | Irani et al. |

(Continued)

FOREIGN PATENT DOCUMENTS

WO 2013188762 A1 12/2013

OTHER PUBLICATIONS

Appendix P, List of IBM Patents or Patent Applications Treated as Related, 2 pages, dated Jan. 30, 2018.

(Continued)

*Primary Examiner* — Thomas G Black
*Assistant Examiner* — Demetra R Smith-Stewart
(74) *Attorney, Agent, or Firm* — Daniel R. Simek

(57) ABSTRACT

Emergency response re-routing is provided. Event information is received, wherein the event information identifies a first location. Emergency resources available at the first location are determined. At least one entity in an area surrounding the first location is identified. A notification is issued to at least one entity in an area surrounding the first location, wherein the notification identifies one or more resources required at the first location.

20 Claims, 3 Drawing Sheets

(56) References Cited

U.S. PATENT DOCUMENTS

| | | |
|---|---|---|
| 2006/0184319 A1 | 8/2006 | Seick et al. |
| 2007/0138347 A1 | 6/2007 | Ehlers |
| 2010/0153002 A1 | 6/2010 | Lee et al. |
| 2010/0250111 A1 | 9/2010 | Gutierrez et al. |
| 2011/0040621 A1 | 2/2011 | Ginsberg et al. |
| 2011/0117878 A1 | 5/2011 | Barash et al. |
| 2013/0325320 A1 | 12/2013 | Dimitriadis |
| 2013/0337430 A1 | 12/2013 | Lowensohn |
| 2014/0032114 A1 | 1/2014 | Titus et al. |
| 2014/0046585 A1 | 2/2014 | Morris, IV et al. |
| 2014/0118140 A1 | 5/2014 | Amis |
| 2014/0365390 A1 | 12/2014 | Braun |
| 2014/0372015 A1 | 12/2014 | Namm |
| 2016/0109250 A1 | 4/2016 | Baughman et al. |

OTHER PUBLICATIONS

Celli et al., "Particle Swarm Optimization for Minimizing the Burden of Electric Vehicles in Active Distribution Networks", Power and Energy Society General Meeting, 2012 IEEE, pp. 1-7, © 2012 IEEE.

Fekete et al., "Empowered by Wireless Communication: Distributed Methods for Self-Organizing Traffic Collectives", ACM Transactions on Autonomous and Adaptive Systems, vol. 5, No. 3, Article 11, Pub. date: Sep. 2010, pp. 11:1-11:30, © 2010 ACM.

Peng et al., "Construction of Command Car for Geological Disaster Emergency Monitoring and Investigating", The Ninth International Conference on Electronic Measurement & Instruments, ICEMI'2009, pp. 4-769-4-772, © 2009 IEEE.

Phuangpornpitak et al., "A Study of particle Swarm Technique for Renewable Energy Power Systems", 2010 Proceedings of the International Conference on Energy and Sustainable Development: Issues and Strategies (ESD), pp. 1-6, 2010, Digital Object Identifier: 10.1109/ESD.2010.5598791.

Stolfi et al., "Red Swarm: Smart Mobility in Cities with EAs", GECCO '13: Proceeding of the Fifteenth Annual Conference on Genetic and Evolutionary Computation Conference, Jul. 2013, Copyright © 2013, Association for Computing Machinery, Inc.

Sun et al., "Map Matching Method of Large-scale Floating Cars Based on Road Incremental Updating under Emergency Accidents", 2010 3rd International Conference on Advanced Computer Theory and Engineering (ICACTE), pp. V6-286-V6-289, © 2010 IEEE.

Valckenaers et al., "Predicting the unexpected", Computers in Industry 62 (2011), pp. 623-637, Accepted Mar. 28, 2011, Available online May 8, 2011, 2011, Elsevier B.V. All rights reserved.

Wedde et al., "Distributed Embedded Real-Time Systems and Beyond: A Vision of Future Road Vehicle Management", 34th Euromicro Conference Software Engineering and Advanced Applications, pp. 401-408, © 2008 IEEE.

Zahradnick, Fred, "Google Adds Automatic Traffic Avoidance Rerouting to its Navigation App", Mar. 7, 2011, <http://gps.about.com/b/2011/03/07/google-adds-automatic-traffic-avoidance-rerouting-to-its-navigation-app.htm>.

Zhang et al., "An Improved Multi-Objective Particle Swarm Optimizer for Air Traffic Flow Network Rerouting Problem", pp. 4B4-1-4B4-11, © 2012 IEEE.

"Traffic rerouting settings—GPS Review Forums", © 2005-2014 All Rights Reserved, <http://forums.gpsreview.net/discussion/9160/traffic-rerouting-settings/p1>.

"Miami-Dade Police Department—Using statistical analysis to find similarities in crime patterns helps break cold case", IBM, A Smarter Planet, <https://www.ibm.com/smarterplanet/us/en/leadership/article/leadership_miami-dade_pd.html>.

_US 10,234,298 B2_

EMERGENCY RESPONSE RE-ROUTER

BACKGROUND OF THE INVENTION

The present invention relates generally to the field of navigation, and more particularly to traffic re-routing.

The Global Positioning System (GPS) is a space-based satellite navigation system that provides location and time information anywhere on Earth where there is an unobstructed line of sight to four or more GPS satellites. The GPS location and time information is available to anyone with a GPS receiver, sometimes referred to as a GPS navigation device or system. A GPS receiver may display maps, turn-by-turn directions, traffic congestion maps and suggested alternative directions, and/or information on nearby amenities and attractions.

A GPS receiver may provide a user with route directions. A GPS receiver may also reroute a user if changing driving conditions or route information render the user's current route not optimal. A navigation system's re-routing algorithms are based on traffic patterns, congestion, or construction, and can re-route a vehicle in order to a faster route by avoiding the congested area.

SUMMARY

According to one embodiment of the present disclosure, a method for emergency response re-routing is provided. The method includes receiving by one or more processors, event information, wherein the event information identifies a first location; determining, by one or more processors, emergency resources available at the first location; identifying, by one or more processors, at least one entity in an area surrounding the first location; and issuing, by one or more processors, a notification to at least one entity in an area surrounding the first location, wherein the notification identifies one or more resources required at the first location.

According to another embodiment of the present disclosure, a computer program product for emergency response re-routing is provided. The computer program product comprises a computer readable storage medium and program instructions stored on the computer readable storage medium. The program instructions include program instructions to receive event information, wherein the event information identifies a first location; program instructions to determine emergency resources available at the first location; program instructions to identify at least one entity in an area surrounding the first location; and program instructions to issue a notification to at least one entity in an area surrounding the first location, wherein the notification identifies one or more resources required at the first location.

According to another embodiment of the present disclosure, a computer system for emergency response re-routing is provided. The computer system includes one or more computer processors, one or more computer readable storage media, and program instructions stored on the computer readable storage media for execution by at least one of the one or more processors. The program instructions include program instructions to receive event information, wherein the event information identifies a first location; program instructions to determine emergency resources available at the first location; program instructions to identify at least one entity in an area surrounding the first location; and program instructions to issue a notification to at least one entity in an area surrounding the first location, wherein the notification identifies one or more resources required at the first location.

DETAILED DESCRIPTION

Embodiments of the present invention further recognize that an optimal (e.g., fastest or shortest) route may be affected by factors other than traffic patterns, congestion, and construction, such as emergency events. Embodiments of the present invention provide for monitoring emergency events based on 911 phone calls or by monitoring police dispatches and dispatch centers. An emergency situation or event, such as a fire or car accident, may disrupt the flow of traffic, in which case a navigation system can re-route a vehicle to avoid the emergency event, or to route the vehicle to the emergency event.

Embodiments of the present invention recognize that in 911 emergency situations, those at the scene of the emergency may benefit from additional medical personnel and other service individuals or vehicles that may be nearby. Vehicles in which these nearby responders are traveling may be routed towards the emergency scene to help. Embodiments of the present invention recognize that current navigation systems do not re-route in response to 911 or emergency transmission. Embodiments of the present invention also recognize that current navigation systems neither re-route based on passenger- nor vehicle-specific information nor re-route vehicles towards an emergency scene based on vehicle properties. Embodiments of the present invention alert individuals who may be able to assist at an emergency scene and re-route them, using GPS, toward the scene and allow those who should avoid the scene to be re-routed away so as to not disrupt the flow of traffic.

Figure 1:
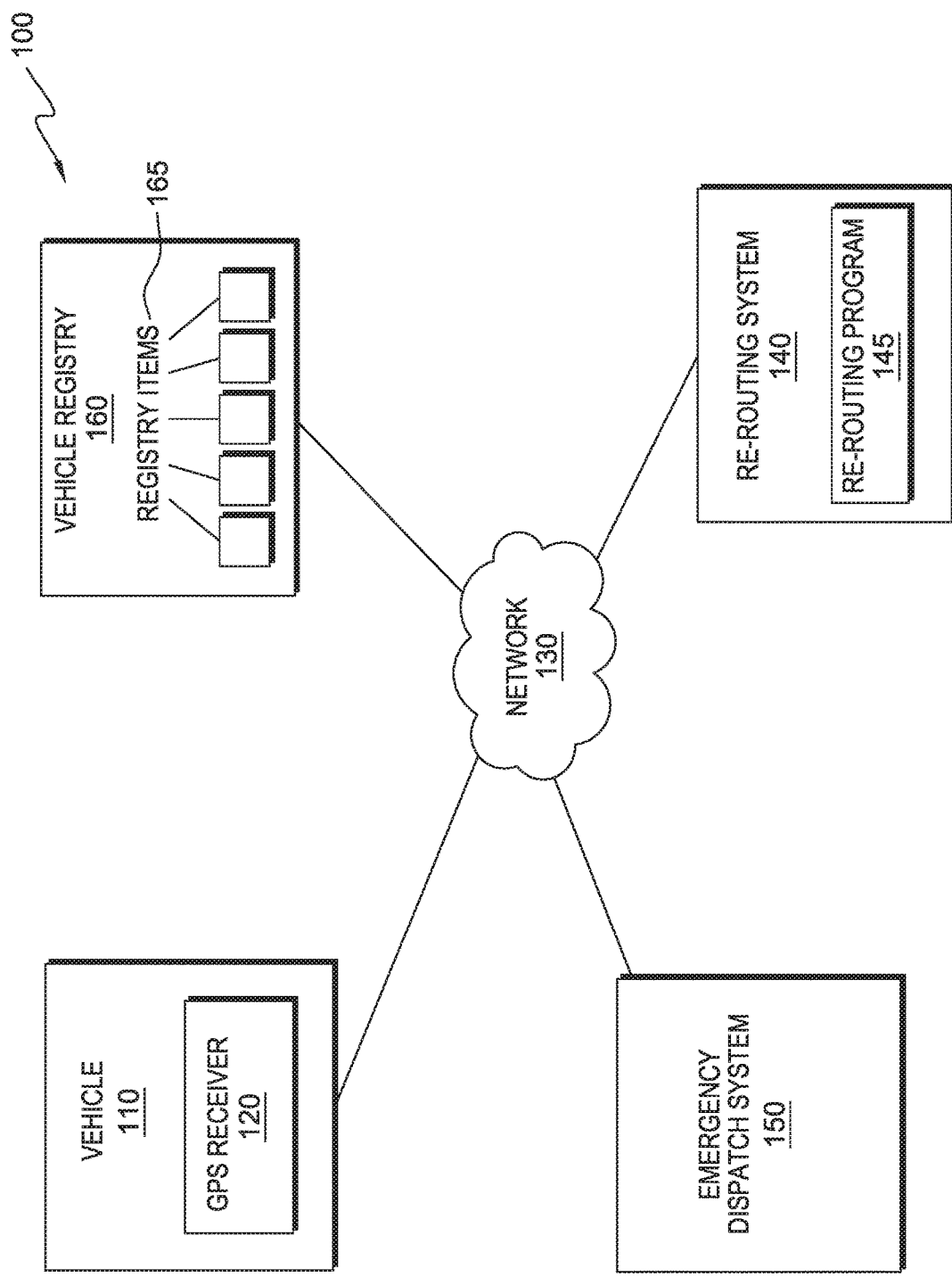
FIG. 1 is a functional block diagram illustrating a distributed data processing environment, in accordance with an embodiment of the present disclosure.

The present invention will now be described in detail with reference to the Figures. FIG. 1 is a functional block diagram illustrating a distributed data processing environment, generally designated 100, in accordance with an embodiment of the present invention. Data processing environment 100 includes vehicle 110, re-routing system 140, emergency dispatch system 150, and vehicle registry 160, all interconnected over network 130. Network 130 is a medium used to provide communication links between various devices and computers connected within data processing environment 100. Network 130 may be, for example, a local area network (LAN), a wide area network (WAN) such as the Internet, any combination thereof, or any combination of connections and protocols that will support communications between GPS receiver 120, re-routing system 140, emergency dispatch system 150, and vehicle registry 160, in accordance with embodiments of the present invention. FIG. 1 is intended as an illustrative example and not as an architectural limitation for the present invention.

Vehicle 110 is any mobile machine that transports passengers or cargo. Vehicle 110 may be, for example, a motorized vehicle, such as an automobile, bus, truck, motorcycle, boat, helicopter, or airplane. In other embodiments, vehicle 110 may be a non-motorized method of transportation, such as bicycle, stroller, or carriage. In yet other embodiments, vehicle 110 may be an individual walking, running, or otherwise moving, provided the individual is moving with GPS receiver 120.

Vehicle 110 includes Global Positioning System (GPS) receiver 120. GPS receiver 120 may be, for example, a laptop computer, tablet computer, personal computer (PC), smart phone, cellular phone, a dedicated global positioning system device, or any programmable electronic device capable of communicating with the Global Positioning System and re-routing system 140 via network 130. In general, GPS receiver 120 may be any computing system capable of processing program instructions and receiving data from the Global Positioning System and re-routing system 140. In the depicted example GPS receiver 120 is located inside vehicle 110. In one embodiment, GPS receiver 120 may be a built in feature of vehicle 110. In other embodiments, GPS receiver 120 may be a separate device (not shown) capable of being relocated to other vehicles, such as a smart phone.

Emergency dispatch system 150 is any system capable of receiving, sending, and otherwise communicating real-time emergency information with re-routing system 140 via network 130. In some embodiments, emergency dispatch system 150 may directly receive emergency information, such as from individuals phoning a number for emergency services (e.g., 911 in some geographical regions), which is sometimes referred to as an emergency dispatch center or public safety answering point. In other embodiments, emergency dispatch system 150 may receive emergency information from another source. Emergency information can refer to accidents, crimes, and other situations that may pose a risk to health, life, property, and/or the environment.

Vehicle registry 160 is a record keeping device that maintains information on vehicles and their operators in order to facilitate appropriate re-routing in accordance with embodiments of the present invention. Vehicle registry 160 may be any web document, program, list, database, catalog, or any other system capable of storing vehicle information and information associated with those vehicles (e.g., owner, owner occupation). Vehicle registry 160 may store information about any vehicle, such as vehicle 110, the typical operators of vehicle 110, and the properties of vehicle 110 (for example, if a snow plow has been appended to the vehicle). This information is located within vehicle registry 160 as registry items 165. In various embodiments, vehicle registry 160 may be a management server, a web server, or any other electronic device or computing system capable of processing program instructions, receiving data, and sending data. The information contained in vehicle registry 160 may be input by the vehicle user, vehicle manufacturer, or any combination of sources. Vehicle registry 160 may receive vehicle information from manual or digital user input or from other databases and may receive information from a combination of sources. In the embodiment of FIG. 1, vehicle registry 160 is capable of communicating with re-routing system 140 via network 130.

Re-routing system 140 may be a management server, web server, or any other electronic device or computing system capable of processing program instructions and receiving and sending data. In some embodiments, re-routing system 140 may be a laptop computer, tablet computer, personal computer, desktop computer, or any programmable electronic device capable of communicating with GPS receiver 120, emergency dispatch system 150, and vehicle registry 160. In other embodiments, re-routing system 140 may be a server computing system utilizing multiple computers as a service system, such as in a cloud environment. In another embodiment, re-routing system 140 may be a computing system utilizing clustered computers and components to act as a single pool of seamless resources when accessed over network 130. In various embodiments, re-routing system 140 may include components, as depicted and described in further detail with respect to FIG. 3.

Re-routing system 140 contains re-routing program 145. Re-routing program 145 receives real-time emergency information from emergency dispatch system 150 and GPS receiver 120, correlates the information received with information stored in vehicle registry 160, and sends navigation information to GPS receiver 120 via network 130. In one embodiment, re-routing program 145 may change or recommend changes to the route provided by GPS receiver 120. In some embodiments, re-routing program 145 may make vehicle and user specific determinations to instruct GPS receiver 120 to direct vehicle 110 to the scene of an emergency or away from the scene of an emergency. For example, in some embodiments, re-routing system 140 may determine that an emergency requires a paramedic, and vehicle registry 160 may contain information that a particular vehicle's owner is a paramedic. In one embodiment, re-routing program 145 is capable of making vehicle specific navigation recommendations by using information stored in vehicle registry 160. In this embodiment, re-routing program 145 transmits route directions to the paramedic's GPS receiver (i.e. GPS receiver 120) that direct the paramedic to the scene of the emergency while navigating other vehicles (without paramedic passengers) away from the scene of the accident.

Figure 2:
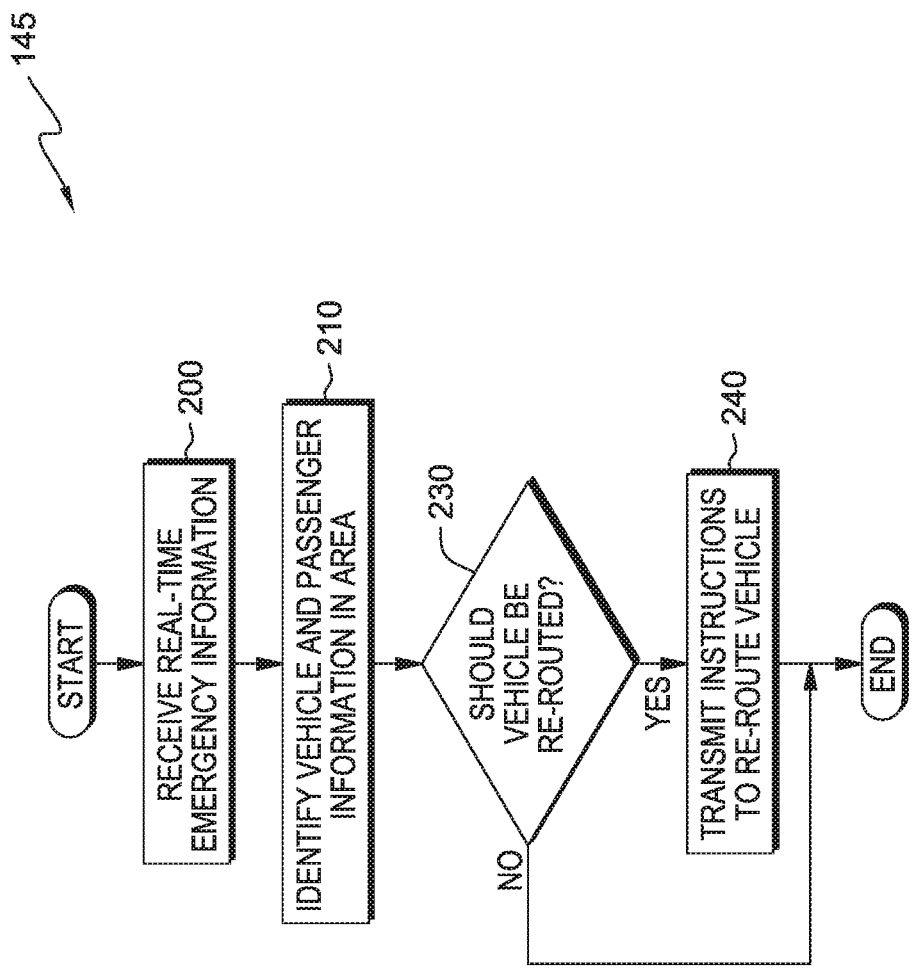
FIG. 2 is a flowchart depicting operations for emergency response re-routing on a computing device within the computing environment of FIG. 1, in accordance with an embodiment of the present disclosure.

FIG. 2 is a flowchart illustrating operational steps of re-routing program 145, executing within data processing environment 100, in accordance with an embodiment of the present invention. Re-routing program 145 gathers real-time information from emergency dispatch system 150, real-time location information from GPS receiver 120, and vehicle information from vehicle registry 160 to determine how vehicle 110 should be routed.

In step 200, re-routing program 145 receives real-time emergency information from emergency dispatch system 150. Emergency dispatch system 150 may transmit emergency or accident information based on human input (e.g., a bystander phoning a 911 dispatch center to report an accident) or other sources, such as alerts received from police. In some embodiments, non-human input may indicate the presence of an emergency to emergency dispatch system 150 (for example, a power outage or a car alarm being activated).

In step 210, re-routing program 145 identifies vehicle location and direction of travel, vehicle passenger information (e.g., skills and expertise of passengers), and vehicle information (e.g., type of vehicle and capabilities). Re-routing program 145 identifies vehicle location and path direction information by communicating with GPS receiver 120 via network 130. Re-routing program 145 identifies vehicle passenger and specification information by communicating with vehicle registry 160 via network 130. For example, vehicle registry 160 may contain information about a sedan. Vehicle registry 160 may catalog that the sedan is primarily driven by a doctor with a nurse as a secondary driver. Re-routing program 145 identifies this information (that the vehicle is driven by a doctor or a nurse)

by communicating with vehicle registry 160 via network 130. Vehicle registry 160 may also contain information about the vehicle itself. For example, vehicle registry 160 may include that the vehicle has an attached snow plow. Vehicle registry 160 may contain any information about vehicle 110 relevant to emergency situations. For example, vehicle registry 160 may identify resources of vehicle 110, such as the skills and expertise of the driver and any passengers, the type and capabilities of the vehicle, and pieces of equipment. In various examples, a piece of equipment may be a defibrillator, a hydraulic car jack, a towing chain, or any other device or piece of equipment that may be required by an emergency condition. In another embodiment, vehicle 110 is a pedestrian who has a device with GPS capabilities (i.e., GPS receiver 120). In this case, the pedestrian may have resources such as skills and expertise or pieces of equipment (e.g., a first aid kit).

In decision 230, re-routing program 145 determines whether vehicle 110 should be re-routed. Re-routing program 145 makes this determination based on the received emergency, location, vehicle, and passenger information. In some embodiments, re-routing information may be stored in vehicle registry 160 or in another registry or repository so long as re-routing information may be accessed by re-routing system 140 via network 130. In some embodiments, re-routing program 145 may determine which vehicle or passenger characteristics should be directed to the scene of the emergency and re-route vehicles within a certain distance to the scene. In some embodiments, re-routing program 145 may identify vehicles on a path direction towards the scene of the accident and then access that vehicle's information from vehicle registry 160. In some embodiments, re-routing program 145 may perform both steps at or around the same time.

For example, re-routing program 145 may receive information that an accident occurred at an intersection. Re-routing program 145 receives information from emergency dispatch system 150 that the emergency scene requires resources including two paramedics and one fire truck. Re-routing program 145 receives information from vehicle registry 160 and several GPS receivers (e.g., GPS receiver 120) that, within a one-mile radius, are two paramedics in two different automobiles, one fireman in an automobile, and one fireman in a fire truck. In this embodiment, re-routing program 145 determines that the two paramedics and the fireman in the fire truck should be re-routed to the emergency scene, and that the fireman in an automobile should be re-routed away from the emergency scene.

In other embodiments, re-routing program 145 may identify vehicles on a path towards the emergency scene that should be re-routed away from the emergency scene by communicating with GPS receivers (e.g., GPS receiver 120) and vehicle registry 160. Re-routing program 145 determines a new route for each of the vehicles that avoid the emergency scene. In some embodiments, re-routing program 145 may offer these re-routes to the vehicle passengers such that the vehicle passenger(s) must select to be re-routed. In other embodiments, re-routing program 145 may automatically re-route vehicles. In other embodiments still, re-routing program 145 may prompt the vehicle passenger for information that is not contained in vehicle registry 160. For example, a vehicle may be carrying a paramedic who does not normally use the vehicle. In such an embodiment, re-routing program 145 prompts the passenger (i.e., through GPS receiver 120 or a text message) for relevant passenger information (e.g., "are you a paramedic?" or "does your vehicle contain a first aid kit?") and determines whether to re-route the vehicle based on the answers provided. In some embodiments, re-routing program 145 may rely entirely on vehicle user input or other information to determine if a vehicle should be re-routed.

Re-routing program 145 may determine whether a vehicle should be re-routed using a number of tactics. For example, re-routing program 145 may store vehicle and passenger information in a feature vector (e.g., as registry items 165). Vector or statistical analysis may be performed on the feature vectors in order to determine a confidence level for whether a vehicle should be re-routed. For example, re-routing program 145 may include a threshold value (e.g., 60% confidence) such that if the results of a particular statistical analysis performed on the feature vector return a confidence level of greater than 60% confidence that the vehicle should be re-routed toward or away from the emergency scene, then re-routing program 145 will transmit re-routing instructions to vehicle 110. Other algorithms or a combination of algorithms may be used in order to determine if the vehicle should be re-routed. For example, re-routing program 145 may use a classification algorithm, matrix factorization, or clustering algorithm.

In some embodiments, re-routing program 145 may create an emergency registry to catalog various emergency situations in which specific personnel and vehicles are typically needed. In such an embodiment, re-routing program 145 can cross-reference passenger and vehicle information with the information stored in the registry, like vehicle registry 160. For example, an emergency registry may store data specifying that, in the event of a two car front end collision, the preferred responders are police, off duty police, EMTs, off-duty doctors, and off duty nurses. Re-routing program 145 may then analyze the identified passenger information for passengers near the scene to identify relevant passengers for re-routing. The emergency registry may also include a hierarchy for re-routing the desired personnel. For example, re-routing program 145 may first search for a police officer, then an off-duty police officer, etc.

For example, an accident may have occurred at a certain location with an EMT vehicle carrying an EMT and a van carrying an off-duty medical doctor nearby. In such an example, re-routing program 145 determines that both vehicles are relevant because both carry medical personnel, but if re-routing system 140 re-routed both vehicles towards the accident it may be redundant. In such an embodiment, re-routing program 145 would compare the features of the two vehicles so that re-routing program 145 can determine which of the vehicles to re-route to the accident scene.

If re-routing program 145 determines that the vehicle should be re-routed (decision 230, yes branch), re-routing program 145 will communicate with GPS receiver 120 via network 130 to re-route vehicle 110 (step 240). Re-routing program 145 re-routes vehicles away from the scene of the emergency or towards the scene of the emergency depending on determinations made above. In some embodiments, re-routing program 145 will communicate with GPS receiver 120 such that the verbal or visual map instructions change. In other embodiments, re-routing program 145 will communicate with GPS receiver 120 such that GPS receiver 120 is able to prompt the user to decide whether the vehicle user would like to be re-routed. In some embodiments, re-routing program 145 determines if the vehicle should be re-routed using a machine learning algorithm. If re-routing program 145 determines that the vehicle 110 should not be re-routed (decision 230, no branch), then re-routing program 145 does not transmit any re-routing instructions or prompts to GPS receiver 120, and GPS receiver 120 maintains the current route, unless altered by an outside source (e.g., a passenger in the vehicle).

Figure 3:
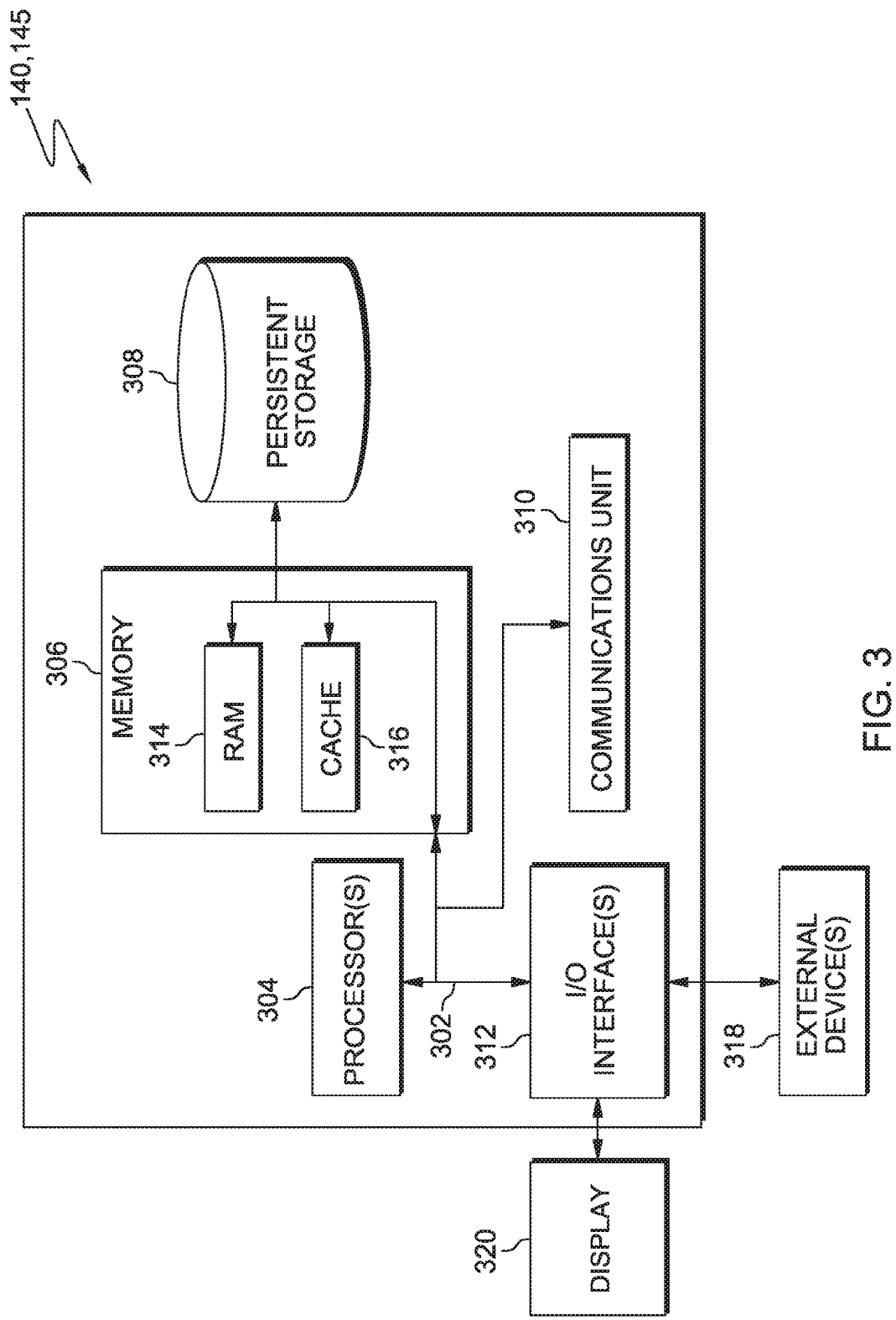
FIG. 3 is a block diagram of components of a computing device executing operations for emergency response re-routing, in accordance with an embodiment of the present disclosure.

FIG. 3 is a block diagram of components of the computing device executing operations for re-routing vehicles, in accordance with an embodiment of the present disclosure. For example, FIG. 3 is a block diagram of re-routing system 140 within data processing environment 100 executing operations of re-routing program 145.

It should be appreciated that FIG. 3 provides only an illustration of one implementation and does not imply any limitations with regard to the environments in which different embodiments may be implemented. Many modifications to the depicted environment may be made.

Re-routing system 140 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Each of vehicle registry 160, emergency dispatch system 150, re-routing system 140, and re-routing program 145 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Re-routing program 145 may be downloaded to persistent storage 308 through communications unit 310.

I/O interface(s) 312 allows for input and output of data with other devices that may be connected to re-routing system 140. For example, I/O interface(s) 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention (e.g., re-routing program 145) can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for emergency response re-routing, the method comprising:
    receiving by one or more processors, event information, wherein the event information identifies a first location and a count of individuals having a skill rating above a predetermined threshold;
    determining, by one or more processors, emergency resources currently available at the first location based upon the received event information;
    identifying, by one or more processors, a first entity in an area surrounding the first location;
    in response to determining, by one or more processors, that the first entity does not have at least one resource of one or more resources required at the first location, generating, by one or more processors, a route for the first entity to avoid the first location by using one or more statistical analyses indicating a confidence level.

2. The method of claim 1, further comprising:
    issuing, by one or more processors, a notification to the first entity, wherein the notification identifies the one or more resources required at the first location.

3. The method of claim 2, wherein the one or more resources required at the first location includes a person having a skill set.

4. The method of claim 2, wherein the one or more resources required includes a piece of equipment.

5. The method of claim 1, wherein the event information identifies the one or more resources required at the first location.

6. The method of claim 5, wherein the one or more resources required include at least one of: (i) a count of emergency responder personnel, (ii) a count of individuals having a skill rating above a predetermined threshold, or (iii) a piece of equipment.

7. The method of claim 1, wherein the event information is received from an emergency dispatch system.

8. The method of claim 1, further comprising:
    in response to determining, by one or more processors, that a second entity, in an area surrounding the first location, does not have a count of individuals having a skill rating above a predetermined threshold, issuing, by one or more processors, a notification to the second entity, wherein the notification reroutes the second entity to avoid the first location.

9. A computer program product for emergency response re-routing, the computer program product comprising:

a computer readable storage medium and program instructions stored on the computer readable storage medium, the program instructions comprising:
  program instructions to receive event information, wherein the event information identifies a first location and a count of individuals having a skill rating above a predetermined threshold;
program instructions to determine emergency resources currently available at the first location based upon the received event information;
program instructions to identify a first entity in an area surrounding the first location; and
in response to determining that the first entity does not have at least one resource of one or more resources required at the first location, program instructions to generate a route for the first entity to avoid the first location by using one or more statistical analyses indicating a confidence level.

10. The computer program product of claim 9, further comprising:
  program instructions to issue a notification to the first entity, wherein the notification identifies the one or more resources required at the first location.

11. The computer program product of claim 10, wherein the one or more resources required at the first location includes a person having a skill set.

12. The computer program product of claim 10, wherein the one or more resources required includes a piece of equipment.

13. The computer program product of claim 9, wherein the event information identifies the one or more resources required at the first location.

14. The computer program product of claim 13, wherein the one or more resources required include at least one of: (i) a count of emergency responder personnel, (ii) a count of individuals having a skill rating above a predetermined threshold, or (iii) a piece of equipment.

15. A computer system for emergency response re-routing, the computer system comprising:
  one or more computer processors;
  one or more computer readable storage media;
  program instructions stored on the computer readable storage media for execution by at least one of the one or more processors, the program instructions comprising:
    program instructions to receive event information, wherein the event information identifies a first location and a count of individuals having a skill rating above a predetermined threshold;
  program instructions to determine emergency resources currently available at the first location based upon the received event information;
  program instructions to identify a first entity in an area surrounding the first location; and
  in response to determining that the first entity does not have at least one resource of one or more resources required at the first location, program instructions to generate a route for the first entity to avoid the first location by using one or more statistical analyses indicating a confidence level.

16. The computer system of claim 15, further comprising:
program instructions to issue a notification to the first entity, wherein the notification identifies the one or more resources required at the first location.

17. The computer system of claim 16, wherein the one or more resources required at the first location includes a person having a skill set.

18. The computer system of claim 16, wherein the one or more resources required includes a piece of equipment.

19. The computer system of claim 15, wherein the event information identifies the one or more resources required at the first location.

20. The computer system of claim 19, wherein the one or more resources required include at least one of: (i) a count of emergency responder personnel, (ii) a count of individuals having a skill rating above a predetermined threshold, or (iii) a piece of equipment.

* * * * *